United States Patent
Harris et al.

(10) Patent No.: US 6,965,756 B2
(45) Date of Patent: Nov. 15, 2005

(54) RF LOOPBACK TEST APPARATUS FOR DATA RADIO TRANSCEIVER

(75) Inventors: Joseph L. Harris, Athens, AL (US); David Paul Nelson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 704 days.

(21) Appl. No.: 09/971,522

(22) Filed: Oct. 5, 2001

(65) Prior Publication Data

US 2003/0068989 A1 Apr. 10, 2003

(51) Int. Cl.$^7$ ................................................ H03C 1/62
(52) U.S. Cl. ................ 455/115.1; 455/425; 455/67.14; 455/115.2; 455/226.1
(58) Field of Search ................................. 455/423–425, 455/522, 67.11, 67.13, 115.1–115.4, 226.1–226.4

(56) References Cited

U.S. PATENT DOCUMENTS

| | | | | |
|---|---|---|---|---|
| 5,337,316 A | * | 8/1994 | Weiss et al. ................. 714/716 |
| 5,442,811 A | | 8/1995 | Kobayashi et al. ......... 455/67.3 |
| 5,481,186 A | | 1/1996 | Heutmaker et al. ...... 324/158.1 |
| 5,802,173 A | * | 9/1998 | Hamilton-Piercy et al. ...... 379/56.2 |
| 5,835,850 A | * | 11/1998 | Kumar ..................... 455/67.14 |
| 6,006,112 A | * | 12/1999 | Rucki et al. ................. 455/561 |
| 6,115,584 A | * | 9/2000 | Tait et al. ...................... 455/73 |
| 6,346,910 B1 | * | 2/2002 | Ito ............................. 342/174 |
| 6,381,473 B1 | * | 4/2002 | Niki ........................ 455/562.1 |
| 2003/0067869 A1 | * | 4/2003 | Harris et al. ................. 370/217 |
| 2004/0024672 A1 | * | 2/2004 | Brake et al. .................. 705/35 |
| 2005/0033707 A1 | * | 2/2005 | Ehlers et al. ............... 705/412 |

* cited by examiner

Primary Examiner—Duc Nguyen
(74) Attorney, Agent, or Firm—Allen, Dyer, Doppelt, Milbrath & Gilchrist, P.A.

(57) ABSTRACT

An RF loopback test circuit is adapted to be coupled to an antenna port of a digital radio, to determine whether the radio is functioning properly. A frequency generator outputs an auxiliary frequency corresponding to the sum or difference between the radio's transmit and receive frequencies. The auxiliary frequency is coupled to a Schottky diode mixer, which is also coupled to the input/output port. If the radio's transceiver section is operating properly, the sum or difference frequency output of the Schottky diode mixer will be passed by only the diplexer's narrowband receive path filter to the radio's receiver section. The mixer's sum frequency is blocked by the diplexer's narrowband filters. Therefore, if the receiver section provides an indication that it is receiving a sufficient signal level from the RF loopback test circuit, it can also be inferred that each of the transmitter and receiver sections is operating properly.

6 Claims, 1 Drawing Sheet

RF LOOPBACK TEST APPARATUS FOR DATA RADIO TRANSCEIVER

FIELD OF THE INVENTION

The present invention relates in general to communication systems and components therefor, and is particularly directed to a relatively low cost and reduced complexity RF loopback test circuit that is adapted to be coupled to the antenna port of a diplexer of a wireless transceiver, such as a digital telecommunications radio, in order to test the functionality of the transmit and receiver sections of the transceiver, as well as the data pump and data interface.

BACKGROUND OF THE INVENTION

Although legacy (copper) wirelines have served as a principal information transport backbone for a variety of telecommunication networks, the continued development of other types of signal transport technologies, particularly those capable of relatively wideband service, including coaxial cable, fiber optic and wireless (e.g., radio) systems, have resulted in a multiplicity of systems that serve a diversity of environments and users, such as ISM (Industrial, Scientific and Medical) customers. A particular advantage of wireless service is the fact that it is very flexible and not limited to serving only customers having access to existing or readily installable cable plants. Moreover, there are many environments, such as, but not limited to portable data terminal equipments (DTEs), where a digital wireless subsystem may be the only practical means of communication. In order to provide digital telecommunication service, the wireless (radio) subsystem is interfaced with an existing digital network's infrastructure, which provides power, and legacy wireline links (that may contain one or more repeaters) to an incumbent service provider site.

As diagrammatically illustrated in FIG. 1, the radio itself employs an ISM-band compatible (e.g., spread spectrum) digital transceiver 10. The transceiver 10 includes a transmitter section 11, that is operative to perform spread spectrum modulation and up-conversion of baseband signals supplied from a baseband processor or digital data pump (such as a T1 framer chip) 15 coupled over a digital communication link 16 (e.g., a T1 link) to a telecommunication network 17.

The output of the transmitter section 11 is an FCC-conformal band RF signal (e.g., ISM 2.4–2.4385 GHz, or 5.725–5.850 GHz spread spectrum signal). This signal is applied to a transmit input port 21 of a diplexer 20, which has an antenna interface port 23 coupled to an associated radio antenna 25. A receiver output port 22 of the diplexer 20 is coupled to a receiver section 12 of the transceiver, in which the spread RF signal received from the remote site radio is down-converted and demodulated to baseband for application to the digital data pump 15.

The transmit and receive ISM band frequencies interfaced by the diplexer 20 with the antenna 25 are prescribed by one of two complementary frequency plans (e.g., a transmit frequency $f_T$=2.462 GHz and a receive frequency $f_R$=2.422 GHz for use by the local site radio). These frequencies correspond to those of a narrowband transmit path filter 26 installed between transmit port 21 and antenna port 23, and a narrowband receive path filter 27 installed between antenna port 23 and receive port 22. The other (complementary) frequency plan is employed by a companion digital radio at a remote site (e.g., having a transmit frequency $f_T$=2.422 GHz and a receive frequency $f_R$=2.462 GHz).

To facilitate selection of either frequency plan, the radio transceiver-diplexer arrangement may be configured as disclosed in the U.S. Patent to P. Nelson et al, U.S. Pat. No. 6,178,312, issued Jan. 23, 2001, entitled: "Mechanism for Automatically Tuning Transceiver Frequency Synthesizer to Frequency of Transmit/Receiver Filter" (hereinafter referred to as the '312 Patent), assigned to the assignee of the present application and the disclosure of which is incorporated herein. In accordance with this patented scheme, the frequency plan (transmit/receive frequency pair) of the radio is defined by selectively coupling the appropriate one of the two diplexer ports to the transmit port of the transceiver and the other diplexer port to the receive port of the transceiver. (At the far end or remote site the diplexer-to-transceiver port connections are reversed.)

Because the environment in which such a digital radio is expected to be used may not provide ready access to alternative communication services, resolving operational problems constitutes a significant challenge to the installer and user. For example, should an impairment or failure occur in initiating or conducting communications between the local radio and a remote site, it would be desirable to know if the problem is with the local radio site itself, or resides in the remote radio site. Also, at either site, feedline, connectors, the antenna itself, or the simple fact that that the link has not been properly 'engineered' can cause problems.

SUMMARY OF THE INVENTION

In accordance with the present invention, an answer to this 'does the radio work?' problem is provided by a relatively low cost and reduced complexity RF loopback test circuit arrangement, that is adapted to be coupled to the antenna port of the radio's diplexer, and is operative to determine whether the radio is functioning properly. For this purpose, a frequency generator, such as a crystal oscillator, outputs an auxiliary frequency that corresponds to the sum or difference between the transmit and receive frequencies employed by the radio under test. The output of the frequency generator is coupled as one input to a Schottky diode mixer, a second input of which is coupled through an attenuator network to an input/output port.

By coupling the input/output port to the radio's diplexer antenna port, then as long as the radio's transceiver section is operating properly, the Schottky diode mixer will produce both a sum frequency (corresponding to a sum of the transmit frequency and the auxiliary frequency), and a difference frequency (corresponding to the difference between the transmit frequency and the auxiliary frequency). Each of these frequencies is coupled to or looped back to respective narrowband filters in the transmit and receive paths through the diplexer. As the correct frequency is passed by only the diplexer's narrowband receive path filter, the receive port of the diplexer will output the correct frequency for application to the radio's receiver section. The undesired frequency will be blocked by each of the diplexer's narrowband filters.

Assuming that the RF loopback circuit is operating correctly, which can be readily indicated by an associated LED, then if the radio's receiver section produces no output, it can be inferred that there is indeed a problem with the radio. However, as long as the receiver section provides an indication that it is receiving a sufficient signal level, then it can also be inferred that each of the transmitter and receiver sections is operating properly.

DETAILED DESCRIPTION

Before describing in detail the new and improved RF loopback circuit arrangement of the present invention, it should be observed that the invention resides primarily in a modular arrangement of conventional RF signaling and interface components, and associated connector hardware, that couples an RF loopback test circuit to the antenna port of a radio diplexer of the type described above. In terms of a practical implementation that facilitates manufacture and coupling to such a radio, this modular arrangement may be readily configured as an application specific integrated circuit (ASIC) chip set, and/or commercially available devices and components. As a consequence, its configuration and the manner in which it may be interfaced with an existing digital radio have been shown in a readily understandable schematic and block diagram format, which shows only those specific details that are pertinent to the present invention, so as not to obscure the disclosure with details that are readily apparent to one skilled in the art having the benefit of present description.

Figure 1:
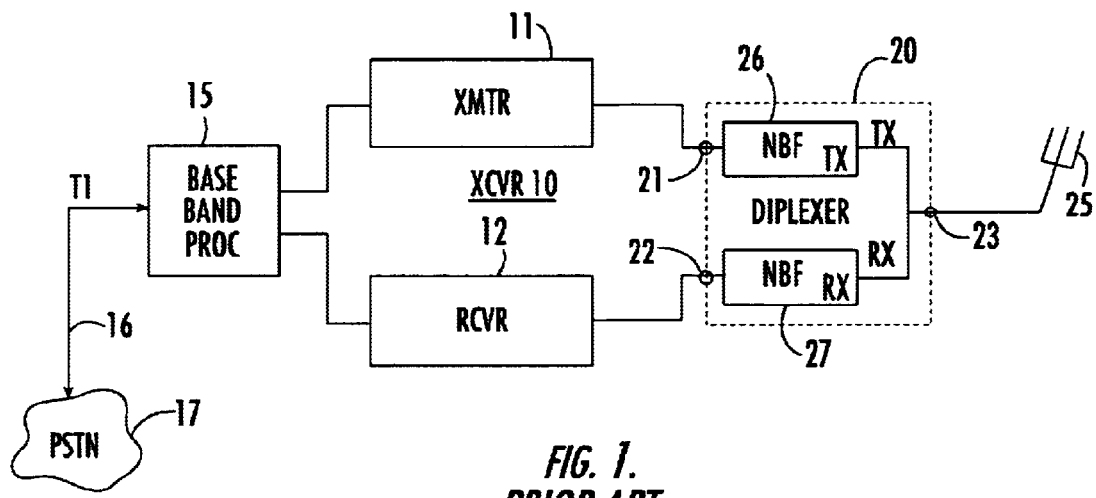
FIG. 1 diagrammatically illustrates the architecture of a digital (T1) radio.
Figure 2:
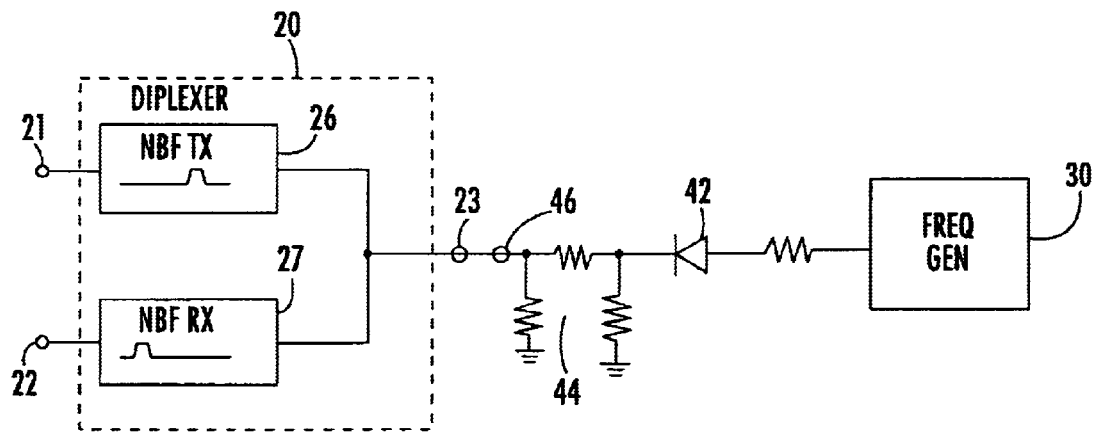
FIG. 2 is a schematic diagram of an embodiment of the RF loopback test arrangement of the invention.

Attention is now directed to FIG. 2, which is a schematic diagram of an embodiment of the RF loopback test arrangement of the invention, and showing the manner in which it may be interfaced with antenna port 23 of the diplexer 20 of the digital radio of FIG. 1. As shown therein, the RF loopback test arrangement comprises a frequency generator 30, such as a crystal oscillator, which is operative to generate an auxiliary frequency $f_A$ having a value on the order of the sum or difference between the transmit and receive frequencies employed by the radio 10. As a non-limiting example, for the respective transmit ($f_T$=2.462 GHz) and receive ($f_R$=2.422 GHz) ISM band frequencies of the transceiver of FIG. 1, the auxiliary frequency generator 30 outputs an auxiliary frequency $f_A$ corresponding to the difference between the transmit and receive frequencies, i.e., $f_A$=(2.462−2.422 GHz)=40 MHz.

The output of the frequency generator 30 is resistor-coupled to one end (anode) of a (Schottky diode) mixer 42, a second end (cathode) of which is coupled through an attenuator network 44 (such as a ground-referenced 20 dB pi-configured resistor network, as shown) to an input/output port 46. As it is coupled to each of the frequency generator 30 and the input/output port 46, the Schottky diode mixer 42 is operative to provide respective output frequencies representative of the sum and difference of the (40 MHz) difference frequency output of generator 30 and the frequency of whatever signal is coupled to the input/output port 46.

Thus, for the frequency parameters of the present example, if the input/output port 46 is coupled to the diplexer's antenna port 23, then as long as the radio's transceiver section 11 is transmitting at $f_T$=2.462 GHz, mixer 42 will produce a sum frequency $f_S$=(2.462+0.040)=2.502 GHz, and a difference frequency $f_D$=(2.462−0.040)=2.422 GHz (which corresponds to the receive frequency $f_R$). Each of these frequencies is presented or looped back to the respective narrowband filters 26 and 27 of the diplexer 20. Since, in the present example, it is the difference frequency $f_D$=2.422 GHz that is associated with either filter and that filter is the narrowband receive path filter 27, then the diplexer's receive port 23 will output the difference frequency $f_D$=2.422 GHz for application to the receiver section 12. The other (sum) frequency $f_S$=2.502 GHz will be blocked by each of narrowband filters 26 and 27.

It can therefore be seen that coupling the RF input/output port 46 of the RF loopback tester to the radio's diplexer antenna port 23, and operating each of the radio and the loopback tester of the invention provides a relatively simple 'localized' test mechanism for testing the functionality of each the transmit and receive sections of the radio. No communication with a remote site need be attempted.

Assuming that the loopback circuit 30 is operating correctly, which can be readily indicated by an associated LED, then if the radio's receiver section 12 produces no output, it can be inferred that there is a problem with the radio. However, if the receiver section 12 is providing an (LED) indication of receiving a sufficient signal level, then it can also be inferred that each of the transmitter and receiver sections is operating properly. Any failure of the radio to receive from a remote site can then be attributed to a problem at the remote site or a local problem with the feedline, connectors, or the antenna itself.

As will be appreciated from the foregoing description, the RF loopback test circuit arrangement provides a reduced complexity scheme for determining whether an operational problem lies with the local radio itself, the remote site radio, or a local problem with the feedline, connectors, or the antenna itself, without the necessity of a communication with a remote site. By simply coupling the RF invention to the radio's diplexer antenna port and monitoring the output of radio's receiver section allows a user to readily determine whether each of the transmitter and receiver sections of the radio is operating properly.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of testing the operability of a communication apparatus having a transmitter section that is adapted to output a communication signal at a first frequency for application to a diplexer and transmission to another communication device, and a receiver section that is coupled to said diplexer and is adapted to receive a communication signal from said another communication device at a second frequency, different from said first frequency said method comprising the steps of:

(a) providing an auxiliary communication device having a frequency generator that is operative to generate an auxiliary frequency signal having a frequency on the order of the sum or difference between said first and second frequencies, and a frequency combiner, coupled to said frequency generator and to an input/output terminal of said auxiliary communication device, and being operative to combine said auxiliary frequency signal with an external signal coupled to said input/output terminal and to produce at said input/output terminal an output frequency corresponding to the sum or difference between said auxiliary frequency and the frequency of said external signal; and (b) coupling said input/output terminal of said auxiliary communication device to said diplexer, and monitoring said receiver section of said communication apparatus for said second frequency.

2. The method according to claim 1, wherein said frequency combiner includes a Schottky diode mixer and an attenuator network coupled between said frequency generator and said input/output terminal.

3. A test architecture for testing the operability of a transceiver that is adapted to transmit on a first communication frequency and to receive on a second communication frequency, and being coupled to a diplexer having an interface port that is adapted to interface wireless communication energy with a telecommunication channel, a first transceiver port adapted to be coupled with a transmission channel port of said radio transceiver, and a second transceiver port adapted to be coupled with a receive transmission channel port of said radio transceiver, said diplexer further including a transmission filter which is operative to pass signals having said first communication frequency and being coupled between said interface port and said first transceiver port, and a receive filter which is operative to pass signals having said communication frequency, and being coupled between said interface port and said second transceiver port, said test architecture comprising:

a frequency generator that is operative to generate an auxiliary frequency signal having a frequency on the order of the sum or difference between said first and second communication frequencies; and a frequency combiner, coupled to said frequency generator and to an input/output terminal, and being operative to combine said auxiliary frequency signal with an external signal coupled to said input/output terminal and to produce at said input/output terminal an output sum or difference frequency corresponding to the sum or difference between said auxiliary frequency and the frequency of said external signal; and wherein said input/output terminal is adapted to be coupled to said interface port of said diplexer, so that the output of receiver section of said transceiver may be monitored for the presence of said second communication frequency.

4. The test architecture according to claim 3, wherein said frequency combiner includes a Schottky diode mixer and an attenuator network coupled between said frequency generator and said input/output terminal.

5. An RF loopback test circuit comprising:

an input/output port that is adapted to be coupled to a transmit-receive communication port of a diplexer of a wireless communication device;

a frequency generator that is operative to output an auxiliary frequency corresponding to the difference or sum between transmit and receive frequencies of said wireless communication device;

a mixer coupled to said input/output port and to said frequency generator, and being operative, in response to receiving said transmit frequency, to produce said receive frequency as an RF loopback output at said input/output port, so that, for proper operation of said wireless communication device, said receive frequency produced at said input/output port will be passed by a narrowband receive path filter of said diplexer and coupled thereby to a receiver section of said wireless communication device.

6. The RF loopback test circuit according to claim 5, wherein said mixer comprises a Schottky diode mixer and an attenuator network coupled between said frequency generator and said input/output port.

* * * * *